US006576286B1

(12) United States Patent
Chen

(10) Patent No.: US 6,576,286 B1
(45) Date of Patent: Jun. 10, 2003

(54) CACTUS FRUIT DRINKS AND FOOD PRODUCTS

(75) Inventor: Jau-Fei Chen, West Orem, UT (US)

(73) Assignee: E Excel International, Springville, UT (US)

( * ) Notice: Subject to any disclaimer, the term of this patent is extended or adjusted under 35 U.S.C. 154(b) by 0 days.

(21) Appl. No.: 09/298,807

(22) Filed: Apr. 23, 1999

(51) Int. Cl.[7] .............................. A23L 2/02; A23L 2/39; A23L 2/52
(52) U.S. Cl. ...................... 426/599; 426/331; 426/590; 426/615; 426/638
(58) Field of Search .................... 426/590, 599, 426/615, 638, 331

(56) References Cited

U.S. PATENT DOCUMENTS

| | | |
|---|---|---|
| 3,227,616 A | 1/1966 | Heinz-Gunter et al. |
| 3,953,615 A | 4/1976 | Gupta et al. ................. 426/594 |
| 4,042,720 A | 8/1977 | Forkner ....................... 426/573 |
| 4,078,092 A | 3/1978 | Nishiyama ................... 426/584 |
| 4,276,890 A | 7/1981 | Fichera ........................ 131/270 |
| 4,281,026 A | 7/1981 | Reale ........................... 426/599 |
| 4,361,554 A | 11/1982 | Saunders |
| 4,615,900 A | 10/1986 | Schenz et al. ............... 426/590 |
| 4,732,773 A | 3/1988 | Schott .......................... 426/590 |
| 4,737,367 A | 4/1988 | Langer et al. ................ 426/72 |
| 4,784,847 A | 11/1988 | Zulliger-Bopp et al. ...... 424/69 |
| 4,795,638 A | 1/1989 | Ayache et al. ........... 424/195.1 |
| 5,000,949 A | 3/1991 | Bias |
| 5,034,226 A | 7/1991 | Beck ........................ 424/195.1 |
| 5,171,577 A | 12/1992 | Griat et al. ................... 424/450 |
| 5,230,889 A | 7/1993 | Inoue ...................... 424/195.1 |
| 5,290,605 A | 3/1994 | Shapira ....................... 424/439 |
| 5,466,455 A | 11/1995 | Huffstutler, Jr. et al. .... 424/401 |
| 5,470,874 A | 11/1995 | Lerner ......................... 514/474 |
| 5,565,199 A | 10/1996 | Page et al. ............... 424/195.1 |
| 5,565,207 A | 10/1996 | Kashibuchi et al. ......... 424/401 |
| 5,571,503 A | 11/1996 | Mausner ....................... 424/59 |
| 5,578,312 A | 11/1996 | Parrinello .................... 424/401 |
| 5,595,743 A | 1/1997 | Wu ......................... 424/195.1 |
| 5,618,521 A | 4/1997 | de Rigal et al. .............. 424/59 |
| 5,643,587 A | 7/1997 | Scancarella et al. ......... 424/401 |
| 5,663,160 A | 9/1997 | Meybeck et al. ............ 514/182 |
| 5,665,365 A | 9/1997 | Bombardelli et al. ........ 424/401 |
| 5,676,956 A | 10/1997 | Duffy et al. ................. 424/401 |
| 5,676,958 A | 10/1997 | Emerson et al. ............. 424/405 |
| 5,720,962 A | 2/1998 | Ivy et al. ..................... 424/401 |
| 5,736,584 A | 4/1998 | Kunkel ........................ 514/919 |
| 5,738,887 A | 4/1998 | Wu ............................... 426/51 |
| 5,744,187 A | 4/1998 | Gaynor ........................ 426/599 |
| 5,747,462 A | 5/1998 | Fuentes ........................ 514/23 |
| 5,773,014 A | 6/1998 | Perrier et al. ................ 424/401 |
| 5,817,299 A | 10/1998 | Manirazman ................. 424/59 |
| 5,834,044 A | 11/1998 | Schmitz et al. ............... 426/73 |
| 5,840,309 A | 11/1998 | Herstein et al. .......... 424/195.1 |

FOREIGN PATENT DOCUMENTS

| | | |
|---|---|---|
| CN | 1090988 A | 8/1984 |
| CN | 87 1 00825 A | 8/1988 |
| CN | 1033278 A | 6/1989 |
| CN | 1048799 | 1/1991 |
| CN | 002142508 | * 3/1993 |
| CN | 1070575 | 4/1993 |
| CN | 1076623 | 9/1993 |
| CN | 1076624 A | 9/1993 |
| CN | 1076624 | 9/1993 |
| CN | 1 076 624 A | 9/1993 |
| CN | 1 090 988 A | 8/1994 |
| CN | 1097618 | 1/1995 |
| CN | 1103779 | 6/1995 |
| CN | 1114872 | 1/1996 |
| CN | 1120410 | 4/1996 |
| CN | 1125052 | 6/1996 |
| CN | 1133142 | 10/1996 |
| CN | 1194104 A | 9/1998 |
| CN | 1211403 A | 3/1999 |
| CN | 1 211 403 A | 3/1999 |
| DE | 27 03 189 A | 1/1977 |
| DE | 2703189 | 8/1978 |
| DE | 2732749 A | 6/1979 |
| DE | 4331252 | 5/1994 |
| ES | 2 041 218 B | 1/1993 |
| FR | 2659014 | 9/1991 |
| JP | 51-115968 | 10/1976 |
| JP | 52-120154 | 10/1977 |
| JP | 80022076 | 6/1980 |

(List continued on next page.)

OTHER PUBLICATIONS

Crosswhite et al., The Annual Saguaro Harvest and Crop Cycle of the Papago, with Reference to Ecology and Symbolism, Desert Plants (1980) vol. 2, No. 1. 1980.
Loro et al. Can. J. Physiol. Pharmacol. vol. 72, Suppl. 1, p. 269 (abstract) 1994.
Palma et al. Natural Colorants for Food, Proceed. $2^{nd}$ Intl. Symp. (abstract) 1996.
Krifa et al. Annales des Falsif. vol. 87, pp. 183–192 (abstract) 1994.
Huang et al. Report of the Taiwan Sugar Res. Inst. vol 0(138), pp. 37–45 (abstract) 1992.
Ewaidah et al. Intl. J. Food Sci. Technol. vol. 27(3), pp. 353–358 (abstract) 1992.
Taylor, M. The Opuntia: a food for the future. Proc. Oxford Symp. On Food, pp. 235–240 (abstract) 1994.
Saenz et al. Acta Horticult. vol. 438, pp. 135–138 (abstract) 1997.
Saenz et al. Lebensmittel–Wissenschaft und. Technol. Vol. 26(5), pp. 417–421 (abstract) 1993.
Saenz et al. Alimentos. vol. 18(3), pp. 29–32 (abstract) 1993.

Primary Examiner—Helen Pratt
(74) Attorney, Agent, or Firm—Jones, Waldo, Holbrook & McDonough; Michael W. Starkweather; Brent T. Winder

(57) ABSTRACT

The present invention relates to novel compositions of cactus fruit extracts combined with ginseng berry extracts and foods and drink products made therefrom. The novel beverages and extracts of the present invention may be used in food products and drinks to enhance flavor and nutritional value.

31 Claims, No Drawings

FOREIGN PATENT DOCUMENTS

| | | |
|---|---|---|
| JP | 58 67151 | 4/1983 |
| JP | 58-067151 | 4/1983 |
| JP | 58 067151 A | 4/1983 |
| JP | 59-227244 | 12/1984 |
| JP | 61 85324 | 4/1986 |
| JP | 61 085324 A | 4/1986 |
| JP | 61-092530 | 5/1986 |
| JP | 63 110009 A | 5/1988 |
| JP | 63 116669 | 5/1988 |
| JP | 63-192705 | 8/1988 |
| JP | 5310527 | 11/1993 |
| JP | 6271452 | 9/1994 |
| JP | 7 267977 | 10/1995 |
| JP | 07 267 977 A | 10/1995 |
| JP | 8332028 | 12/1996 |
| JP | 8333260 | 12/1996 |
| JP | 9 249576 | 9/1997 |
| JP | 09 249576 A | 9/1997 |
| JP | 10072338 | 3/1998 |
| KR | 97 032 503 A | 7/1996 |
| KR | 032503 | 7/1997 |
| KR | 97 032 503 A | 9/1997 |
| NL | 144830 | 2/1975 |
| RU | 2053272 C1 | 1/1996 |
| RU | 2091469 C1 | 9/1997 |
| WO | 93/11779 | 12/1992 |
| WO | WO 9507681 | 3/1995 |
| WO | WO 96 27383 A | 9/1996 |
| ZA | 6 000 062 A | 3/1966 |
| ZA | 9304523 | 4/1994 |

* cited by examiner

CACTUS FRUIT DRINKS AND FOOD PRODUCTS

RELATED APPLICATIONS

The following applications are being filed concurrently herewith on this 23rd day of April 1999 and are incorporated herein by reference:

| Title | Atty Docket No. | Express Mailing Label Nos. |
|---|---|---|
| Cactus Fruit Skin Care Products | 7537.0029 | EL 113 362 519 US |
| Cactus Fruit Powder Dietary Supplements | 7537.0031 | EL 113 362 465 US |
| Ginseng Berry Topical Application | 7537.0027 | EL 113 362 505 US |
| Ginseng Berry Drink and Food Compositions | 7537.0028 | EL 113 362 482 US |
| Ginseng Berry Powder Dietary Supplements | 7537.0030 | EL 113 362 496 US |

FIELD OF THE INVENTION

The present invention relates generally to the field of botanical and nutritional food products and more particularly to nutritional drinks prepared with cactus fruit juice. Preferred embodiments of the present invention comprise novel compositions of cactus fruit and other beneficial ingredients prepared for human consumption.

BACKGROUND

The human physiological need for vitamins has been well established. Regular dietary consumption of vitamins is essential to good health. Various organizations and government agencies have published recommended quantities for vitamin consumption. One well known standard in the United States is the U.S. Recommended Daily Allowance (RDA) which recommends quantities for the daily intake of vitamins.

While the need for vitamins is well known, die average person fails to consume the recommended daily intake of vitamins through their normal diet. Often this is due to a busy content. For others, food rich in vitamin content may just not be readily available. Whatever the reason, many people do not consume enough vitamins in their daily diet.

Vitamin supplements have become common and are distributed in a variety of forms. Pills, capsules, elixirs, tablets, powders and other forms abound on the market as a means for obtaining a proper daily vitamin intake. For some, this is an acceptable source of vitamins, however, many people cannot consume vitamins in these forms. Children and the elderly are especially averse to consumption of these products. This may be due to sensitive gag reflexes or a strong distaste for the product's form or taste. Regardless of the reason, many people find concentrated vitamin supplements unpalatable and unacceptable as a source of daily vitamin intake.

Fruit juice drinks are a common source of refreshment and nutrition. Many fruit drinks contain naturally occurring vitamins. Others maybe vitamin enriched through the addition of vitamin supplements. However, the addition of large amounts of vitamin supplements calm adversely affect the taste and mouth reel of a fruit drink. The addition of vitamin supplements can cause a metallic taste, a fish-like taste and distinctly non-fruit-like aromas. These are obviously unpalatable and undesirable in a fruit juice product.

Common fruit drinks with high vitamin content are often highly acidic. For example, citrus fruits often have very high acidity. For those with sensitive stomachs and digestive tracts, this acidity can cause an upset stomach and aggravate existing problems such as ulcers and stomach reflux, thereby precluding consumption of those juices. Fruit juices with high vitamin content, but less acidity, are preferred by these consumers.

Natural foods are popular among health-conscious consumers today. Many people prefer to get their vitamins and other nutrients in a "natural" way from naturally occurring sources. "Natural" vitamins are now in high demand. These are vitamins which are found in a product in its natural state without vitamin supplements or vitamin "fortification." Many fruit and vegetable juices are known to have high concentrations of vitamins in their natural state and are often a preferred source of vitamins.

Among these natural vitamin containing juices, the health-conscious consumer often prefers a flavor which is unique or exotic and mildly sweet. This gives the perception of a healthy substance that is not high in calories. Unique and exotic tastes are often preferred and perceived to be more refreshing so long as they can be associated with a natural fruit, vegetable, herb or other natural source.

The majority of Americans, and people of many other cultures, are accustomed to consuming stimulants as a part of their daily routine. In the United States, the stimulant of choice is currently caffeine. Millions of cups of coffee are imbibed each morning to kick-start the day and throughout the day to provide a pick-me-up in the afternoon or evening. Cola drinks are also a source of caffeine which are consumed in large amounts. Other cultures prefer tea as a source of caffeine stimulant. The addictive nature of caffeine may explain its widespread acceptance and enormous consumption rate. Caffeine-containing drinks continue to be popular despite effects that are detrimental to the body. Caffeine can be detrimental to the digestive tract as well as other systems. Caffeine's addictive effects and a user's psychological dependence on caffeine's stimulation make it difficult to abandon after continued use. An alternative drink which can provide gentle stimulation would be a welcome alternative to caffeine-containing drinks.

SUMMARY AND OBJECTS OF THE INVENTION

Preferred embodiments of the present invention provide a completely natural, natural-tasting, refreshing beverage which contains many essential vitamins, minerals and amino acids as well as the benefits of selected herbs and Royal Jelly. An unique or exotic flavor is also provided through the use of combinations of cactus fruit juice, ginseng berry juice and cactus pad or stem juice.

Accordingly, it is an object of preferred embodiments of the present invention to provide a beverage with a unique or exotic flavor.

It is another object of preferred embodiments of the present invention to provide a beverage comprised of natural juices with naturally occurring vitamins.

It is an additional object of preferred embodiments of the present invention to provide a source of vitamins, amino acids, minerals, herbs and/or other nutrients for those who are averse to consuming tablets, capsules and similar items.

A further object of preferred embodiments of the present invention is to provide a source of vitamins, amino acids, minerals, herbs mid/or other nutrients that can be easily consumed with fast food or while the consumer is on-the-go.

An additional object of preferred embodiments of the present invention is to provide a beverage that will naturally stimulate the mind and body.

A once further object of preferred embodiments of the present invention is to provide a naturally vitamin rich beverage that will not upset a sensitive stomach.

Another object of preferred embodiments of the present invention is to provide a naturally vitamin rich beverage that has lower acidity than common citrus fruit juices.

Yet another object of preferred embodiments of the present invention is to provide a naturally vitamin-rich beverage with no artificial sweeteners.

An additional object of preferred embodiments of the present invention is to provide a naturally vitamin-rich beverage with no preservatives.

Another object of preferred embodiments of the present invention is to provide an alternative to caffeine-containing beverages which can stimulate the consumer without the addictive or health- repressing qualities of caffeine.

DETAILED DESCRIPTION OF THE PREFERRED EMBODIMENTS

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

A preferred embodiment of the present invention comprises a fruit juice beverage containing juice from cactus fruit. A preferred genus of cactus is the Cereus genus with several preferable species such as *Cereus giganteus* and *Cereus giganteus* and *Cereus thurberi*. Another preferred genus is the Opuntia which includes many preferred species including *Opuntia strigil, Opuntia basilaris, Opuntia rufida, Opuntia phacacantha, Opuntia engelmannii, Opuntia erinacea, Opuntia humifusa, Opuntia phaecantha, Opuntia chlorotica, Opuntia polycantha, Opuntia violacea, Opuntia spinoshacca, Opuntia lindheimeri and Opuntia macrorhiza*. The species within the Opuntia genus of cactus have relatively flat, oval-shaped pads, similar to the leaves or branches of a bush, which may or may not have spines thereon. Cactus fruit or "pears" generally grow around the perimeter of the oval-shaped pads on these cacti. In the practice of the present invention, juice is derived from the cactus fruit. In some presently preferred embodiments, juice may also be derived from the cactus pads or stems.

Cactus fruit grow in several varieties with varying color, seed content, sugar content and size. Colors range from green and yellow to purple, orange and red, fruits generally range in size from 110 grams to 150 grams. Seed content, by weight, typically ranges between 2 and 4 grams per fruit while sugar content generally ranges between 11% and 16%. Cactus fruit used in a preferred embodiment of the process and beverage of the present invention are red with average to high sugar content obtained from the Cereus Grandiflorus species.

Laboratory analysis of the juice from cactus fruit used for the preferred embodiment of the beverage of the present invention shows a high concentration of essential vitamins. The following Table 1 gives the result of a laboratory analysis of the cactus juice squeezed from the Cereus Grandiflorus cactus used in a preferred embodiment of the present invention.

TABLE 1

| Thiamin | 116.6 ug/gram of product |
| Riboflavin | 221.9 ug/gram of product |
| Vitamin C | 8.35 mg/gram of product |
| Vitamin A | 309 IU |
| Vitamin E | 1.36 IU |
| Vitamin D3 | 120 IU |
| Beta Carotene | 16.6 IU |
| Cyanocobalamine B12 | 91 mg/gram of product |

Cactus fruit juice has also been found to be an effective anti-oxidant. Laboratory analysis reveals that one gram of cactus fruit contains 7 times more antioxidant that 10 mg of Vitamin C. The results of these tests prove that cactus fruit juice is an excellent source of vitamins.

The present invention may also contain juice from the ginseng berry. Although the ginseng root is sometimes used as an herbal supplement, the ginseng berry has been overlooked as a food product or medication due, partially, to its somewhat bitter taste. It has been discovered that ginseng berry juice can be made palatable by blending with other ingredients which mask or change its bitter taste. One such ingredient is cactus fruit juice.

The mellow-sweet flavor of cactus fruit juice overcomes the bitter nature of ginseng berry juice, forming a tasty blend that is both palatable and highly nutritional.

The large quantity and size of the seeds in the ginseng berry also deter potential consumers, however the method of the present invention uses a micro-filtration system to eliminate the seeds from the juice.

Laboratory analysis of the juice from ginseng berries used for preferred embodiments of the of the present invention also shows a high concentration of essential vitamins. The following Table 2 gives the result of a laboratory analysis of the essential vitamins and ingredients found in ginseng berry juice.

TABLE 2

| Riboflavin | 171.9 ug/gram of product |
| Vitamin C | No |
| Vitamin A | 109 IU |
| Vitamin E | 1.5 IU |
| Vitamin D3 | No |
| Beta Carotene | 16.9 IU |

Advantageously, ginseng berry juice also acts as an anti-oxidant. Laboratory analysis reveals that one gram of ginseng berry contains 1.4 times more antioxidant than 10 mg of Vitamin C.

While more modern machinery may be used to produce juice from cactus fruit, cactus pads and ginseng berries, a preferred method of the present invention comprises a manual process described hereafter. The skin of the cactus fruit is peeled off by hand, using a knife, leaving the soft red meat of the fruit exposed. Seeds are then removed by filtration through a coarse screen. The remaining meat is squeezed in a press to remove as much juice as can be practically removed. The squeezed meat is subsequently blended, preferably with a mixer-type appliance and filtered through a 0.2 micron filter using a micro-filtration system. Cactus pads are processed in a similar way. Juice is extracted from cactus pads and cactus fruit separately so that the two juices may be blended in specific proportions. Juice is extracted from ginseng berries in much the same way as cactus except the berries are not peeled before crushing.

After juice has been extracted, it is blended with other natural ingredients which add flavor, sweetness and other nutritional and physiological benefits.

Consumption of natural herb products may also increase health and vitality. The effects of various herbs and plant products can be beneficial to the nervous, digestive and circulatory systems as well as other physiological functions. Herbs which, when consumed, are beneficial to one's health and vitality may be considered to be "health promoting agents." The combination of herbal ingredients with vitamin rich cactus juice offers the health advantages of natural vitamins and herbs in a palatable, easy-to-consume drink.

Ginseng root is also known to have beneficial physiological effects. It is believed to help regulate blood pressure and increase the body's resistance to adverse physical, chemical and biological influences. Ginseng root can stimulate physical and mental activity and protect against the adverse effects of mental and physical stress. It may also improve mental concentration and stimulate brain cells. Ginseng root may be considered to be a natural health promoting agent. In the prior art, like some vitamins, ginseng root is often offered in capsules or tablets in a raw form. Again, this can be difficult for some to consume.

Royal jelly is a natural substance produced by worker bees as a food source for the queen bee. It is known to have beneficial physiological effects when consumed by humans as well. It contains vitamins A, C, E and numerous B vitamins. It also contains minerals and many amino acids necessary for the body. Royal jelly is believed to increase vitality and longevity in humans. Royal jelly may be considered a natural health promoting agent.

In the prior art, royal jelly is also distributed in capsule form, making it undesirable to those averse to capsules. Nectar or elixir forms are also available, but these concentrated liquids are also unpalatable or otherwise unacceptable to some consumers. It has been discovered that an exotic-tasting, vitamin-rich fruit drink is an excellent medium for consumption of royal jelly.

Preferred embodiments of the present invention combine the juice of cactus fruit with herbal stimulants; and/or other natural health promoting agents to create a beverage that is pleasurable to consume and which provides a great variety of ingredients essential to health and vitality.

Other preferred embodiments of the present invention may be created from cactus fruit juice or products made therefrom. Cactus fruit juice may be concentrated by known techniques to form a concentrated extract or syrup. This concentration may be performed on the pure juice of the cactus fruit or after mixing with health promoting ingredients or other ingredients. The concentrated extract or syrup may then be diluted with water to return it to a juice state or mixed with other ingredients or otherwise processed to create other products such as candies, jellies or dehydrated fruit products.

A powder may also be derived from the cactus fruit juice either before or after addition of other ingredients. Once the cactus fruit has been peeled, the meat is crushed and squeezed after which the seeds are removed by filtration and centrifuge, this creates a slurry solution which can be further processed and dried into a powder.

Under one method of the present invention the slurry solution is dried by a hot air drying method wherein the shiny is placed on a conveyor belt exposed to extremely hot air. Once dry, the product is ground to a specific size.

Another drying method used to create the powder of the present invention employs a freeze-drying method wherein the slurry is frozen and then dehydrated in a vacuum. The resulting dehydrated product is then ground to the desired size.

In yet another, alternative drying method for producing the powdered products of the present invention, the slurry solution is further filtered using a 0.2 micron micro-filtration system to produce a liquid product. All particles of the fruit and seeds are thereby removed. The liquid product is then spray-dried to powder form. In the spray-drying process the liquid product is sent to an atomizer which uses a nozzle or centrifugal rotating wheel to atomize the liquid product into a spray. Droplets created by the atomizer contain both water and cactus juice solids. This atomized spray is sent to a drying chamber with a controlled temperature and air flow. Atomized droplets are kept in contact with the heated air until the desired moisture content is achieved. During this process, the droplets become particles which are subsequently separated from the air stream. The resulting particles may then be ground to a finer powder if desired.

Regardless of the drying process used, the powder may be blended with other ingredients to create the novel vitamin-rich drink formulas or syrups of the present invention.

A generalized formula for a beverage of the present invention comprises cactus fruit juice and ginseng berry juice combined with one or more natural health promoting ingredients. Natural health promoting ingredients may include, for example and not by way of imitation, ginseng root, chinese white flower, purslane herb, cinnamon bark, gou ten, cassia tora seed, mint herb, licorice root, silver flower, sorbitol, lycium fruit, liriope root, schizandra seed, forsythia fruit, japanese sophora, chinese dodder, marsh parsley, chinese lovage, angelica root, paris herb, anise seed, ginger root, imperate root, poria (mushroom powder), orange peel, cornel fruit, bamboo leaf, hawthorn berry, eucomia bark and lemon extract. The formula may also contain other ingredients to promote health or adjust flavor.

Other ingredients, given by way of example and not by limitation may be sweeteners, flavorings, or preservatives. The formula may also contain juices from other fruits, vegetables or herbs to provide vitamins or other health promoting ingredients or simply to adjust flavor or provide a variety of flavors. Juices found to be desirable, especially by those with sensitive digestive tracts are passion fruit, mango, guava and melons, However, citrus fruits and other tropical fruits maybe equally palatable and nutritious.

One presently preferred embodiment of the present invention comprises the following ingredients in the amounts indicated:

| | |
|---|---|
| Cactus Fruit Juice | about 15%–75% |
| Ginseng Berry Juice | about 15%–50% |
| Fruit Juice | about 0%–50% |
| Cactus Pad Juice | about 0%–30% |
| Herbal ingredient | about 0%–15% |
| Natural sweetener | about 0%–15% |
| Royal Jelly | about 0%–8% |

Another presently preferred embodiment of the present invention comprises the following ingredients in the amounts indicated:

| | |
|---|---|
| Cactus Fruit Juice | about 15%–75% |
| Ginseng Berry Juice | about 15%–50% |
| Cactus Pad Juice | about 0%–30% |
| Ginseng (root) | about 0%–15% |
| Wild Honey | about 0%–15% |
| Royal Jelly | about 0%–8% |

Yet another presently preferred embodiment of the present invention comprises the following ingredients in the amounts indicated:

| | |
|---|---|
| Cactus Fruit Juice | about 15%–75% |
| Ginseng Berry Juice | about 15%–50% |
| Sorbitol | about 0%–15% |
| Wild Honey | about 0%–15% |
| Royal Jelly | about 0%–8% |
| Sodium Benzoate | up to 0.1% |

EXAMPLE 1

A beverage within the scope of the present invention was prepared by mixing the following ingredients in amounts given by weight percentage:

| | |
|---|---|
| Cactus Fruit Juice | 40% |
| Ginseng Berry Juice | 20% |
| Cactus Pad Juice | 10% |
| Ginseng (root) | 10% |
| Wild Honey | 15% |
| Royal Jelly | 5% |

This juice beverage was found to be mildly sweet, mentally and physically stimulating and nutritious.

EXAMPLE 2

A beverage within the scope of the present invention was prepared by mixing the following ingredients in amounts given by weight percentage:

| | |
|---|---|
| Cactus Fruit Juice | 40% |
| Ginseng Berry Juice | 10% |
| Cactus Pad Juice | 10% |
| Ginseng (root) | 10% |
| Purified water | 8% |
| Wild Honey | 10% |
| Royal Jelly | 5% |
| Mulberry leaves | 5% |
| Natural flavors | 2% |

This juice beverage was found to be mildly sweet, mentally and physically stimulating and nutritious.

EXAMPLE 3

A beverage within the scope of the present invention was prepared by mixing the following ingredients in amounts given by weight percentage:

| | |
|---|---|
| Cactus Fruit Juice | 49% |
| Ginseng Berry Juice | 20% |
| Sorbitol | 15% |
| Wild Honey | 10% |
| Royal Jelly | 5% |
| Sodium Benzoate | 1% |

This juice beverage was found to be mildly sweet and nutritious.

EXAMPLE 4

A beverage within the scope of the present invention was prepared by mixing the following ingredients in amounts given by weight percentage:

| | |
|---|---|
| Water | 40% |
| High Fructose Corn Syrup or Sucrose | 13% |
| Cactus Fruit Extract | 25% |
| Ginseng Berry Extract | 15% |
| Royal Jelly | 5% |
| Citric Acid | 2% |

This juice beverage was found to be mildly sweet and nutritious.

EXAMPLE 5

A beverage within the scope of the present invention was prepared by mixing the following ingredients in amounts given by weight percentage:

| | |
|---|---|
| Water | 50% |
| High Fructose Corn Syrup or Sucrose | 13% |
| Ginseng Berry Extract | 10% |
| Cactus Fruit Extract | 25% |
| Citric Acid | 2% |

This juice beverage was found to be delicious arid nutritious.

EXAMPLE 6

A carbonated beverage within the scope of the present invention was prepared by mixing the following ingredients in amounts given by weight percentage:

| | |
|---|---|
| Carbonated Water | 45% |
| High Fructose Corn Syrup or Sucrose | 13% |
| Cactus Fruit Extract | 19% |
| Ginseng Berry Extract | 15% |
| Flavoring | 5% |
| Citric Acid | 2% |
| Sodium Benzoate | <0.1% |
| Gum Arabic | 1% |

This juice beverage was found to be effervescent, mildly sweet and nutritious.

EXAMPLE 7

A carbonated beverage within the scope of the present invention was prepared by mixing the following ingredients in amounts given by weight percentage:

| | |
|---|---|
| Carbonated Water | 40% |
| High Fructose Corn Syrup or Sucrose | 13% |
| Cactus Fruit Extract | 20% |
| Ginseng Berry Extract | 10% |
| Ginseng Root | 8% |
| Flavoring | 5% |
| Citric Acid | 2.9% |
| Sodium Benzoate | <0.1% |
| Gum Arabic | 1% |

This juice beverage was found to be effervescent, mildly sweet, stimulating and nutritious. Various flavorings may be added to tailor the taste to a specific palate. Fruit flavorings have been found to be most delicious.

EXAMPLE 8

A hard candy with the scope of the present invention is prepared by mixing the following ingredients in amounts given by weight percentage:

| | |
|---|---|
| Water | 5% |
| Fructose | 20% |
| Sugar | 20% |
| Cactus Fruit Extract | 25% |
| Ginseng Berry Extract | 15% |
| Citric Acid | 10% |
| Flavoring | 5% |

This hard candy formula will yield a sweet candy with an exotic flavor. Various flavorings may be added to tailor the taste to a specific palate. Fruit flavorings have been found to be most delicious.

EXAMPLE 9

A jelly candy within the scope of the present invention is prepared by mixing the following ingredients in amounts given by weight percentage:

| | |
|---|---|
| Cactus Fruit Extract | 30% |
| Ginseng Berry Extract | 20% |
| Hydrogenated Starch | 20% |
| Modified Food Starch | 15% |
| Citric Acid | 10% |
| Flavoring | 5% |

EXAMPLE 9

A dehydrated fruit "leather" within the scope of the present invention is prepared by mixing the following ingredients in amounts given by weight percentage:

| | |
|---|---|
| Fructose | 20% |
| Sugar | 20% |
| Cactus Fruit Extract | 30% |
| Ginseng Berry Extract | 15% |
| Citric Acid | 10% |
| Flavoring | 5% |

EXAMPLE 10

A fruit jelly product within the scope of the present invention is prepared by mixing the following ingredients in amounts given by weight percentage:

| | |
|---|---|
| Fructose | 20% |
| Sugar | 20% |
| Cactus Fruit Extract | 25% |
| Ginseng Berry Extract | 20% |
| Pectin | 10% |
| Flavoring | 5% |

The above formulas provide a natural, vitamin rich, herbally enhanced and/or royal jelly fortified beverage or food product with a unique and exotic taste which can be consumed by those who are tablet and capsule averse and which can be packaged so as to make it convenient for consumers of almost any lifestyle. Preferred embodiments also provide a gentle herbal stimulant which can be used as a healthier alternative to caffeine,

What is claimed is:

1. A consumable product, comprising:
   a) a cactus concentrate;
   b) a ginseng concentrate from a ginseng berry; and
   c) at least one natural health promoting ingredient.

2. The consumable product of claim 1, further comprising an herb.

3. The consumable product of claim 1, further comprising an herbal stimulant.

4. The consumable product of claim 1, further comprising ginseng root.

5. The consumable product of claim 1, further comprising royal jelly.

6. The consumable product of claim 1, wherein said natural health promoting ingredient comprises an ingredient selected from the group consisting of ginseng root, chinese white flower, purslane herb, cinnamon bark, gou ten, cassia tora seed, mint herb, licorice root, silver flower, sorbitol, lycium fruit, liriope root, schizandra seed, forsythia fruit, japanese sophora, chinese dodder, marsh parsley, chinese lovage, angelica root, paris herb, anise seed, ginger root, imperate root, poria (mushroom powder), orange peel, cornel fruit, bamboo leaf, hawthorn berry, eucomia bark, lemon extract and mulberry leaves.

7. The consumable product of claim 1 wherein said food product takes the form of a candy.

8. The consumable product of claim 1 wherein said food product takes the form of a jelly.

9. The consumable product of claim 1 wherein said food product takes the form of a dehydrated fruit product.

10. The consumable product of claim 1, wherein the cactus concentrate is from a cactus fruit.

11. The consumable product of claim 1, wherein the cactus concentrate is from a cactus pad.

12. The consumable product of claim 1, wherein the cactus concentrate is from a cactus stem.

13. The consumable product of claim 1, wherein the cactus concentrate is from a cactus fruit and a cactus pad.

14. A naturally vitamin-rich beverage comprising:
    cactus fruit juice; and,
    ginseng berry juice.

15. The beverage of claim 14 further comprising an herb.

16. The beverage of claim 14 further comprising ginseng root.

17. The beverage of claim 14 further comprising royal jelly.

18. The beverage of claim 14 further comprising an ingredient selected from the group consisting of ginseng root, chinese white flower, purslane herb, cinnamon bark, gou ten, cassia tora seed, mint herb, licorice root, silver flower, sorbitol, lycium fruit, liriope root, schizandra seed, forsythia fruit, japanese sophora, chinese dodder, march parsley, chinese lovage, angelica root, paris herb, anise seed, ginger root, imperate root, poria (mushroom powder), orange peel, cornel fruit, bamboo leaf, hawthorn berry, eucomia bark and lemon extract.

19. The beverage of claim 14 further comprising cactus pad juice.

20. The beverage of claim 14 further comprising honey.

21. The beverage of claim 14 further comprising tropical fruit juices.

22. The beverage of claim 14 further comprising citrus fruit juices.

23. The beverage of claim 14 further comprising carbonated water.

24. A naturally vitamin-rich beverage comprising by weight:
   a) about 15%–75% cactus fruit juice;
   b) about 15%–50% ginseng berry juice;
   c) about 0%–30% cactus pad juice;
   d) about 0%–15% herbal stimulant;
   e) about 0%–15% sweetener;
   f) about 0%–8% royal jelly; and
   g) about 0%–50% fruit juice.

25. The beverage of claim 24 wherein said herbal stimulant is ginseng root.

26. The beverage of claim 24 wherein said sweetener is wild honey.

27. The beverage of claim 24 further comprising fruit juice taken from a tropical or citrus fruit.

28. A naturally vitamin-rich beverage comprising, by weight:

| | |
|---|---|
| about 40% | Cactus Fruit Juice; |
| about 20% | Ginseng Berry Juice |
| about 10% | Cactus Pad Juice; |
| about 10% | Ginseng (root); |
| about 15% | Wild Honey; and, |
| about 5% | Royal Jelly. |

29. A drink mix in powder form comprising:
   dehydrated cactus fruit juice; and,
   dehydrated ginseng berry juice.

30. The drink mix of claim 29 wherein said powder is formed by a spray-drying process, a freeze-drying process or a hot air drying process.

31. The drink mix powder of claim 29 further comprising an ingredient selected from the group consisting of ginseng root, royal jelly, chinese white flower, purslane herb, cinnamon bark, gou ten, cassia tora seed, mint herb, licorice root, silver flower, sorbitol, lycium fruit, liriope root, schizandra seed, forsythia fruit, japanese sophora, chinese dodder, marsh parsley, chinese lovage, angelica root, paris herb, anise seed, ginger root, imperate root, poria (mushroom powder), orange peel, cornel fruit, bamboo leaf, hawthorn berry, eucomia bark and lemon extract.

\* \* \* \* \*